United States Patent
Yokoyama

(10) Patent No.: US 6,832,773 B2
(45) Date of Patent: Dec. 21, 2004

(54) SUSPENSION

(75) Inventor: Kenji Yokoyama, Kanagawa (JP)

(73) Assignee: Mitsubishi Fuso Truck and Bus Corporation, Tokyo (JP)

( * ) Notice: Subject to any disclaimer, the term of this patent is extended or adjusted under 35 U.S.C. 154(b) by 14 days.

(21) Appl. No.: 10/447,965

(22) Filed: May 30, 2003

(65) Prior Publication Data

US 2003/0222387 A1 Dec. 4, 2003

(30) Foreign Application Priority Data

| May 30, 2002 | (JP) | .................................... P.2002-156538 |
| May 30, 2002 | (JP) | .................................... P.2002-156539 |
| May 30, 2002 | (JP) | .................................... P.2002-156542 |

(51) Int. Cl.[7] .............................................. B60G 3/10
(52) U.S. Cl. ...................... 280/124.171; 280/124.174; 280/124.175
(58) Field of Search ................... 280/124.124, 124.125, 280/124.165, 124.17, 124.171, 124.172, 124.173, 124.174, 124.175; 267/260, 269

(56) References Cited

U.S. PATENT DOCUMENTS

| 4,779,894 A | * | 10/1988 | Cowburn ............. 280/124.134 |
| 5,251,930 A | * | 10/1993 | Kusaka et al. ......... 280/124.14 |
| 5,826,896 A | * | 10/1998 | Baumann ............. 280/124.171 |
| 6,029,987 A | * | 2/2000 | Hoffman et al. ...... 280/124.171 |
| 6,189,904 B1 | * | 2/2001 | Gentry et al. ......... 280/124.175 |
| 6,457,729 B2 | * | 10/2002 | Stenvall ............... 280/124.134 |
| 6,530,587 B2 | * | 3/2003 | Lawson et al. ........ 280/124.17 |

FOREIGN PATENT DOCUMENTS

JP          6-79609 U      11/1994

* cited by examiner

Primary Examiner—Paul N. Dickson
Assistant Examiner—Toan C To
(74) Attorney, Agent, or Firm—Birch, Stewart, Kolasch & Birch, LLP

(57) ABSTRACT

A suspension includes wheel supporting members for supporting wheels; a first leaf spring having both end portions each disposed on an upper side of one of the wheel supporting members; a second leaf spring extending along the first leaf spring; a pivot for supporting the second leaf spring on a vehicle body; a spacer provided between the first and second leaf springs; sliders fixed on the second leaf spring but being in slidable contact with the first leaf spring; and receiving pieces interposed between the both end portions and the wheel supporting members. Each of the receiving pieces includes an engaging portion for engaging with one of the both end portions. Each of the receiving pieces includes an elastic member capable of deforming to follow a relative displacement between the first leaf spring and the wheel supporting member in the vehicle width direction.

4 Claims, 3 Drawing Sheets

SUSPENSION

The present disclosure relates to the subject matter contained in Japanese Patent Application Nos. 2002-156538, 2002-156539 and 2002-156542 all filed May 30, 2002, which are incorporated herein by reference in their entireties.

BACKGROUND OF THE INVENTION

1. Field of the Invention

The present invention relates to a suspension in a vehicle, particularly to an independent suspension of a laterally mounted leaf spring type for independently suspending wheels on both sides of the vehicle by using a leaf spring provided along the vehicle width direction.

2. Background Art

An example of a conventional suspension having a leaf spring in a vehicle width direction is described in JP-UM-A-6-79609. The suspension includes a single leaf spring made of synthetic resin disposed along the vehicle width direction and coil springs arranged respectively on left and right sides of a vehicle. When the coil springs are also used in addition to the leaf spring in this way in order to apply to a truck having a large carrying capacity, there arise problems as follows. In addition to an increase in the cost due to the coil spring, it is necessary to secure a space for installing the coil springs respectively on the left and right sides of the vehicle. Further, man-hours for assembling the left and right coil springs to the vehicle increases.

Therefore, there is requested an independent suspension which can dispense with a coil spring by sufficiently ensuring spring rigidity of the suspension by laminating two sheets of leaf springs and which is excellent in durability.

SUMMARY OF THE INVENTION

It is an object of the invention to provide an independent suspension which can sufficiently ensure spring rigidity of the suspension by using two sheets of laminated leaf springs and which is excellent in durability.

The invention provides a suspension including: wheel supporting members for supporting left and right wheels respectively on a vehicle body movably in vertical direction; a first leaf spring extending along a vehicle width direction on a lower side of the vehicle body and having both end portions each disposed on an upper side one of the wheel supporting members; a second leaf spring disposed between the first leaf spring and the vehicle body and extending along the first leaf spring; a pivot projected from a lower face of the vehicle body and supporting a middle portion in the vehicle width direction of the second leaf spring on the vehicle body; a spacer provided between the second leaf spring and the first leaf spring in the vicinity of the pivot; sliders fixed on lower faces of both end portions of the second leaf spring and brought into slidable contact with upper faces of the both end portions of the first leaf spring; and receiving pieces interposed between the both end portions and the wheel supporting members respectively; wherein each of the wheel supporting members includes a recess portion opened upwardly on which the receiving pieces is mounted to be prevent from detachment; each of the receiving pieces includes an engaging portion for engaging with one of the both end portions of the first and second leaf springs; and each of the receiving pieces includes an elastic member capable of deforming to follow a displacement of a relative position between the first leaf spring and one of the wheel supporting members in the vehicle width direction.

Therefore, as a result of attaching the first leaf spring and the second leaf spring to the vehicle in this way, when load from the wheel supporting member is inputted to the both end portions of the two leaf springs, the two leaf springs can be bent taking the pivot and the spacer arranged in the vicinity thereof as a fulcrum. Thus, the wheels can elastically be suspended from the vehicle body.

Further, when the first leaf spring and the second leaf spring are bent, a relative displacement is brought about in the vehicle width direction between the both end portions of the two leaf springs. However, it is possible to transmit only a load in a vertical direction from the both end portions of the second leaf spring to the both end portions of the first leaf spring without producing substantially any load in the vehicle width direction.

Further, when the first leaf spring and the second leaf spring are bent, a relative displacement occurs in the vehicle width direction between the first leaf spring and the wheel supporting member. However, since the elastic members of the receiving pieces are deformed to respectively follow the relative displacement in the vehicle width direction between the both end portions of the first leaf spring and the wheel supporting members, occurrence of friction between the both end portions of the first leaf spring and the wheel supporting members can be prevented.

Preferably, one of the second leaf spring and the slider engaged therewith includes a projection extending in the vertical direction. The other of the second leaf spring and the slider engaged therewith includes a hole portion for receiving the projection. The engaging portions of the receiving pieces are hole portions into which the both end portions of the first leaf spring and the second leaf spring can be inserted along with the sliders.

Therefore, the slider can be locked on the second leaf spring by using a simple structure of fitting the projection into the hole portion. In a state of assembling the slider between the first and the second leaf springs in this way, by inserting the both end portions of the first and the second leaf springs respectively into the hole portions of the receiving pieces along with the sliders, a leaf spring assembly can be formed before integrating it to the vehicle. Therefore, the man-hour for assembling can be reduced.

Preferably, the first and the second leaf springs are formed so that widths of the both end portions in the front and rear direction of the vehicle are narrowed toward outer sides in the vehicle width direction. The engaging portion of each of the receiving pieces is an erected wall disposed along one end portions of the first and second leaf springs. The slider includes a flange portion extending at least in downward from an end edge thereof, the end edge extending along the vehicle width direction, the flange portion capable of sliding along a sidewall of the recess portion.

Therefore, when the both end portions of the second leaf spring are displaced relative to the receiving pieces outward in the vehicle width direction, the both end portions are brought into contact with the erected walls of the receiving pieces. Further, when the both end portions of the second leaf spring are displaced relative to the receiving pieces inward in the vehicle width direction, the flange portions of the slider fixed to the one end portion of the second leaf spring can slide along the first leaf spring and along the sidewall of the recess portion. Thus, detachment of the second leaf spring can be prevented.

Further, by assembling the slider between the first and second leaf springs, mutual position shift between the first and second leaf springs is restricted. Therefore, operations of inserting the both end portions of the first and second leaf springs into the hole portions of the receiving pieces along with the slider is facilitated.

Preferably, the spacer includes: a metal plate adhered to the second leaf spring; and an elastic member made of rubber connected to the metal plate by vulcanizing adherence and brought into contact with the first leaf spring.

Thus, the metal plate of the spacer is firmly fixed to the second leaf spring by using the adhesive and the elastic body made of rubber is solidly fixed to the metal plate by using vulcanizing adherence. Therefore, the spacer can be made more undetachably. Further, since the metal plate is adhered to the leaf spring on the upper side which is a tension face, adhesive force of the adhesive can be maintained favorably.

There arises a problem in which strength of the leaf spring is deteriorated due to high temperature in the case where the elastic member made of rubber is directly adhered to the leaf spring by vulcanization. However, according to the structure, such a problem can be avoided.

BRIEF DESCRIPTION OF THE DRAWINGS

The present invention may be more readily described with reference to the accompanying drawings.

DETAILED DESCRIPTION OF THE PREFERRED EMBODIMENTS

Figure 1:
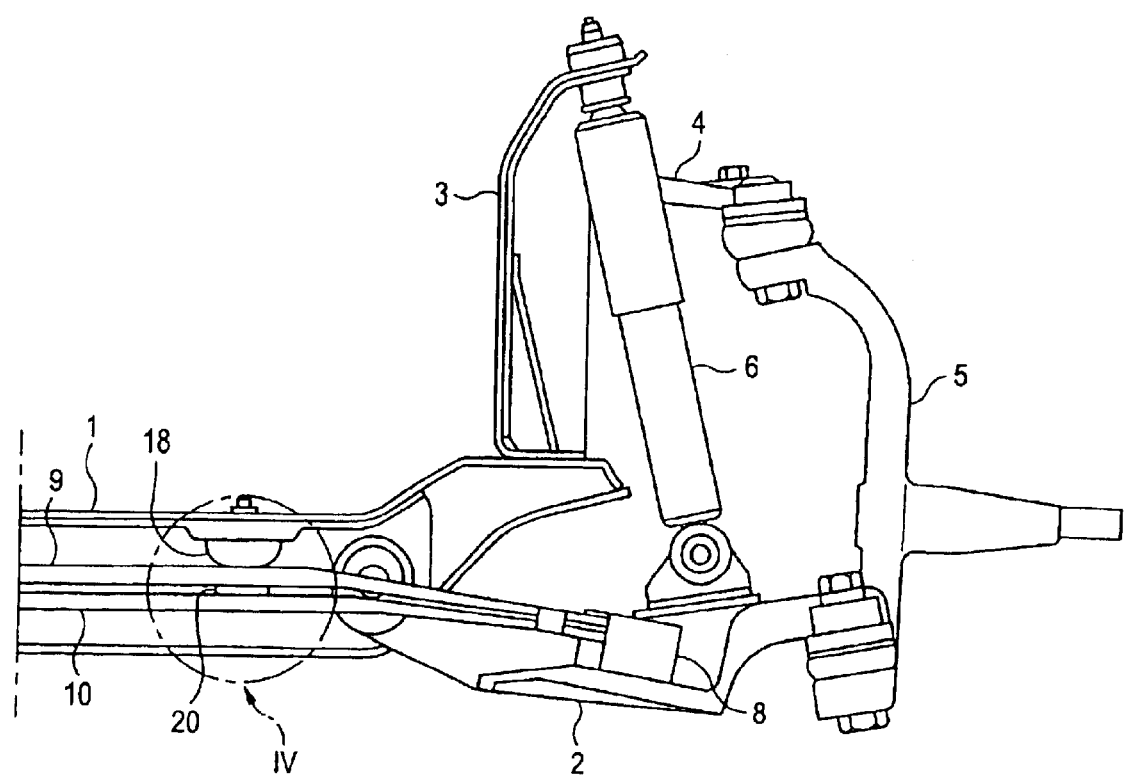
FIG. 1 is a rear view of a main portion in an embodiment of the invention.
Figure 2:
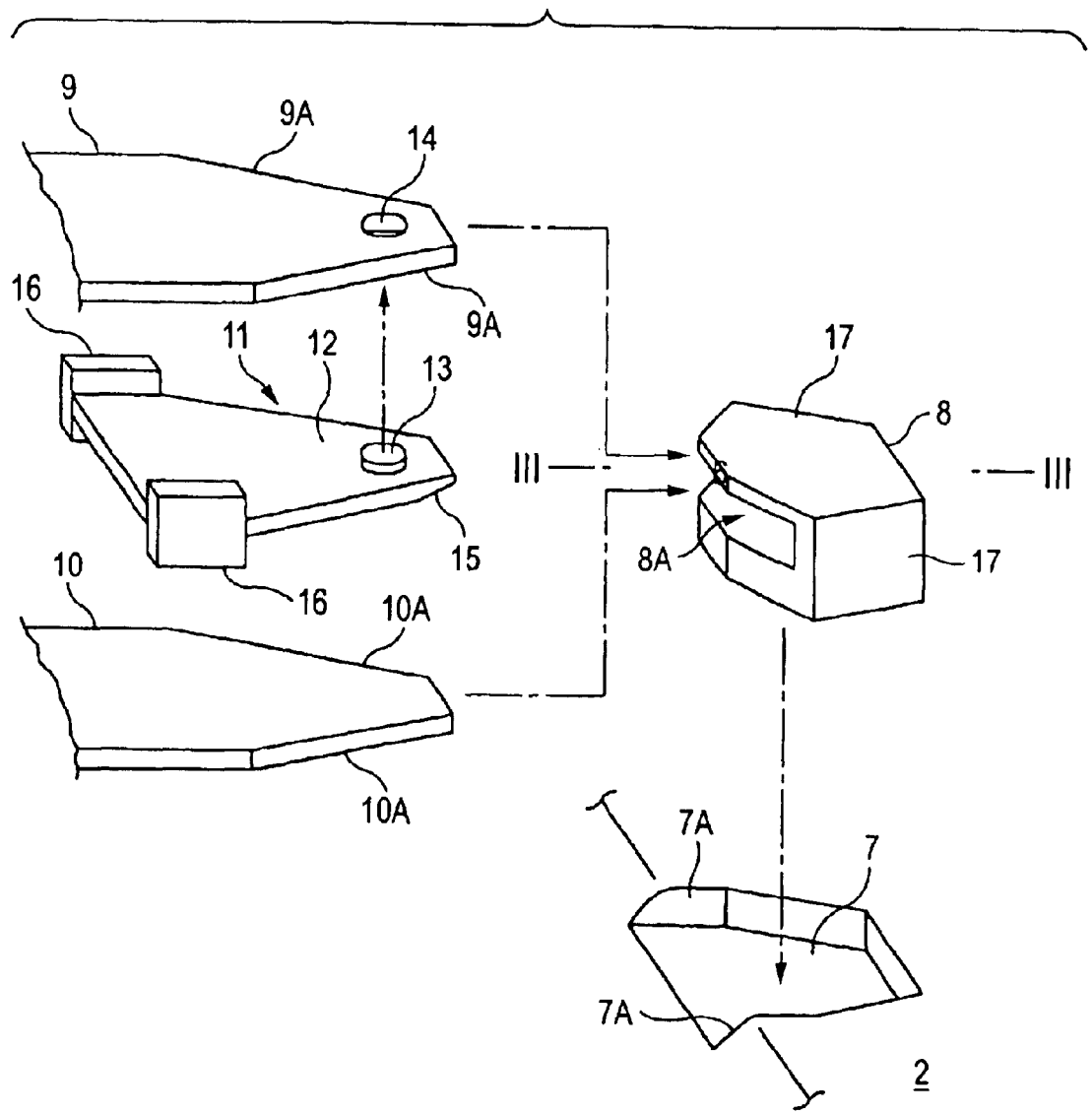
FIG. 2 is a partially exploded perspective enlarged view of the embodiment.
Figure 3:
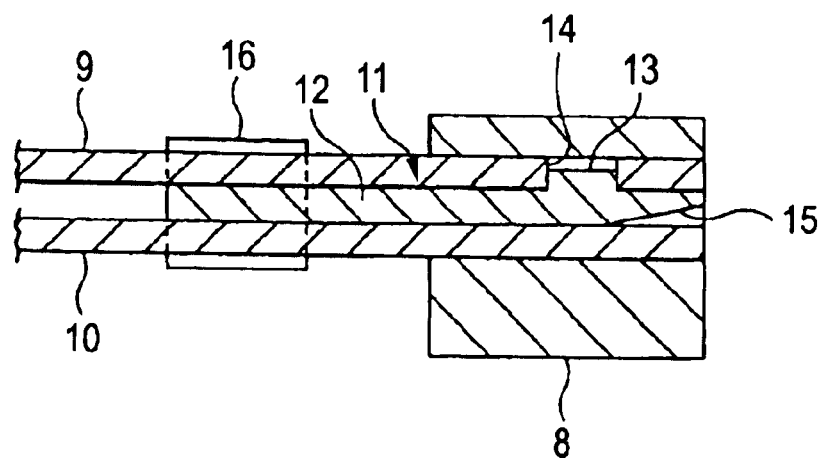
FIG. 3 is an enlarged view in a vertical section taken along a line III—III of FIG. 2.
Figure 4:
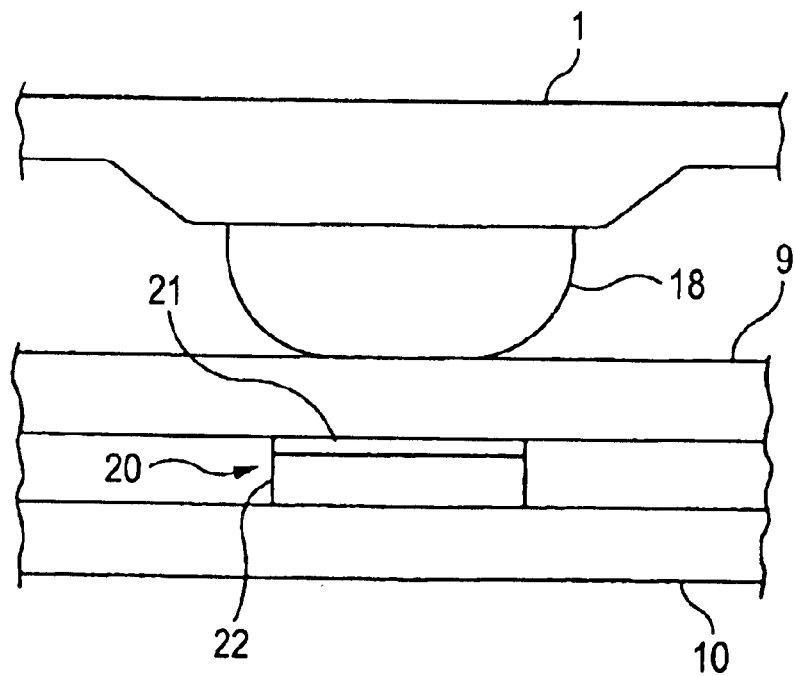
FIG. 4 is an enlarged portion of IV portion of FIG. 1.

An embodiment of the invention shown in the drawings will be explained as follows.

A cross member 1 extending in a vehicle width direction is connected to a vehicle body (not illustrated). Each of both left and right ends of the cross member 1 is pivotally joined to one end of a suspension lower arm 2 and to one end of a suspension upper arm 4 via a tower member 3. A wheel (not illustrated) is attached to a knuckle 5. The knuckle 5 bridges between the suspension lower arm 2 and the suspension upper arm 4. A shock absorber 6 is attached to span the suspension lower arm 2 and the tower member 3. According to the embodiment, each of the wheel supporting members includes the suspension lower arm 2, the suspension upper arm 4 and the knuckle 5.

Receiving pieces 8 made of rubber are mounted into recess portions 7. The recess portions 7 are substantially in a trapezoidal shape and are formed on the left and right suspension lower arms 2 while positioning the receiving pieces 8. Two sheets of a leaf spring 9 (second leaf spring) and a leaf spring 10 (first leaf spring) both made of spring steel are mutually laminated in vertical direction and arranged in the vehicle width direction along the cross member 1. A slider 11 has a flat portion 12 made of synthetic resin such as polyacetal resin. The flat portion 12 is sandwiched between the leaf springs 9 and 10 at their left and right ends respectively. A projection 13 formed in an oval shape extends upwardly from the flat portion 12. The projection 13 is fitted into a slot 14 (hole portion) to be fixed. Thus, the both ends of leaf spring 9 and 10 are inserted into a hole potion 8A so that the sliders 11 are positioned to the leaf spring 9. An erected wall 17 of the receiving piece 8 is formed along chipped-off end edges 9A and 10A of the leaf springs 9 and 10. Along the chipped-off end edges 9A and 10A and toward outer sides in the vehicle width direction, the both end portions of the leaf springs 9 and 10 become narrower in width in a front and rear direction of the vehicle.

The slider 11 has a chamfer portion 15 formed on a lower face of an end portion thereof positioned outward in the vehicle width direction. The chamfer portion 15 makes thickness of the slider 11 thinner toward the outer side in the vehicle width direction. Flanges 16 are integrally formed with the slider 11. The flanges 16 extend upward and downward from end edges of the slider 11 which extend along the vehicle width direction. The flanges 16 are arranged along the leaf springs 9 and 10 and side walls 7A of the recess portion 7 of the suspension lower arm 2.

A spacer 20 is disposed between the leaf springs 9 and 10 in the vicinity of a pivot 18 projecting downward from the cross member 1. The spacer 20 includes an iron plate 21 (metal plate) and an elastic rubber member 22. The iron plate 21 is firmly adhered to a lower face of the leaf spring 9 by using adhesive such as acetal resin. The elastic rubber member 22 is vulcanizedly adhered to the iron plate 21. A lower face of the elastic rubber member 22 is brought into elastic contact with an upper face of the leaf spring 10. The leaf springs 9 and 10 are supported by the pivot 18 from upper sides thereof.

In the above-described apparatus, the leaf springs 9 and 10 are elastically bent in the vertical direction in accordance with an acting load in the vertical direction. The left and right shock absorbers 6 operate in telescopic motions in accordance with a displacement of the vehicle body in the vertical direction. The vehicle body is suspended by the left and right wheels pertinently.

When the leaf springs 9 and 10 are bent, a relative displacement between the leaf springs 9 and 10 occurs in the vehicle width direction at the both end portions. However, it is possible to transmit a load only in the lower direction from the both end portions of the leaf spring 9 to the both end portions of the leaf spring 10 without generating a load in the vehicle width direction, since the slider 11 is interposed between the leaf springs 9 and 10. Further, the chamfer portion 15 is formed on the lower portion of the end portion of the slider 11 outwardly positioned in the vehicle width direction so that thickness of the slider 11 become thinner toward outside in the vehicle width direction. Therefore, even when the acting load on the leaf springs 9 and 10 is comparatively large, face pressure acting from the end portion of the leaf spring 10 outwardly positioned in the vehicle width direction to the lower face of the end portion of the slider 11 outwardly positioned in the vehicle width direction can surely be reduced. Therefore, partial increase in the face pressure acting on the lower face of the end portion of the slider 11 can be avoided. Thus, partial wearing of the lower face of the end portion of the slider 11 can be readily prevented.

When the leaf springs 9 and 10 are bent, a relative displacement occurs in the vehicle width direction between the leaf spring 10 and the suspension lower arm 2. Since the receiving piece 8 made of rubber is deformed to follow the relative displacement in the vehicle width direction between the both end portions of the leaf spring 10 and the suspension lower arm 2, occurrence of friction between the both end portions of the leaf spring 10 and the suspension lower arm 2 can be avoided.

When the both end portions of the leaf spring 9 relatively are displaced to the receiving pieces 8 outwardly in the vehicle width direction, the both end portions are brought into contact with the erected walls 17 of the receiving pieces 8. Further, when the both end portions of the leaf spring 9 are relatively displaced to the receiving pieces 8 inwardly in the vehicle width direction, the flange portions 16 of the slider 11, engaged with the both end portions of the leaf spring 9, slide along the leaf springs 9 and 10 and the side walls 7A of the recess portions 7 of the suspension lower arm 2. Thus, with respect to the front and rear direction of the vehicle, the leaf springs 9 and 10 are positioned relative to the suspension lower arm 2.

Whereas adhering force between the iron plate and the rubber elastic member by the adhesive is comparatively small, adhesive force between the leaf spring 9 and the iron plate 21 is comparatively large. Further, the iron plate 21 is adhered to the lower face of the leaf spring 9, that is, a tension face side of the leaf spring 9. Therefore, the adhering force can excellently be ensured. Further, adhesive force of the rubber elastic member 22 by vulcanization exerted to the iron plate 21 is also large. Therefore, the first spacer 20 can attain a favorable durability. Further, it is not necessary to employ a heat treatment while adhering the iron plate 21 to the leaf spring 9. Further, the rubber elastic member 22 of the first spacer 20 is brought into elastic contact with the leaf spring 10. Therefore, even when the first spacer 20 is arranged between the leaf springs 9 and 10, the strength of the leaf springs 9 and 10 is not deteriorated at all.

The above-described suspension is assembled by assembling the leaf spring 9 adhered with the spacer 20, the slider 11 and the leaf spring 10 to each other to insert into the hole portion 8A of the receiving piece 8, mounting the receiving piece 8 into the recess portion 7 of the suspension lower arm 2 and thereafter coupling the suspension lower arm 2 to the knuckle 5. At this occasion, by interposing the slider 11 between the leaf springs 9 and 10, the leaf springs 9 and 10 are brought into a state in which mutual position shift does not occur. It is therefore possible to readily form the leaf spring assembly prior to installing it to the vehicle, by inserting each of the both end portions of the leaf springs 9 and 10 along with the slider 11 into the hole portion 8A of the receiving piece 8. Accordingly, the man-hour for assembling can be reduced.

As described above in details, according to the embodiment, it is possible to provide a suspension which can sufficiently ensure spring rigidity by using two sheets of laminated leaf springs and which is excellent not only in durability but in assembling operability.

The invention may be embodied in other specific forms without departing from the spirit or essential characteristics thereof. The present embodiment is therefore to be considered in all aspects as illustrative and not restrictive, the scope of the invention being indicated by the appended claims rather than by foregoing description and all changes which come within the meaning and range of equivalency of the claims are therefore intended to be embraced therein.

According to a first aspect of the invention, an independent suspension can be provided which can sufficiently ensure spring rigidity by using two sheets of laminated leaf springs and which is excellent in durability According to a second aspect of the invention, a structure of the suspension can be simplified and a man-hour for assembling can be reduced.

Further, according to a third aspect of the invention, detachment of the second leaf spring can be further firmly prevented.

Further, according to a fourth aspect of the invention, in addition to the effect of the first aspect, durability of the spacer can be promoted and therefore, durability of the suspension can further be promoted.

What is claimed is:

1. A suspension comprising:
   wheel supporting members for supporting left and right wheels respectively on a vehicle body movably in vertical direction;
   a first leaf spring extending along a vehicle width direction on a lower side of the vehicle body and having both end portions each disposed on an upper side of one of the wheel supporting members;
   a second leaf spring disposed between the first leaf spring and the vehicle body and extending along the first leaf spring;
   a pivot projected from a lower face of the vehicle body and supporting a middle portion in the vehicle width direction of the second leaf spring on the vehicle body;
   a spacer provided between the second leaf spring and the first leaf spring in the vicinity of the pivot;
   sliders fixed on lower faces of both end portions of the second leaf spring and brought into slidable contact with upper faces of the both end portions of the first leaf spring; and
   receiving pieces interposed between the both end portions and the wheel supporting members respectively;
   wherein each of the wheel supporting members includes a recess portion opened upwardly on which the receiving pieces is mounted to prevent detachment;
   each of the receiving pieces includes an engaging portion for engaging with one of the both end portions of the first and second leaf springs; and
   each of the receiving pieces includes an elastic member capable of deforming to follow a displacement of a relative position between the first leaf spring and one of the wheel supporting members in the vehicle width direction.

2. The suspension according to claim 1,
   wherein
   one of the second leaf spring and the slider engaged therewith includes a projection extending in the vertical direction;
   the other of the second leaf spring and the slider engaged therewith includes a hole portion for receiving the projection; and
   the engaging portions of the receiving pieces are hole portions into which the both end portions of the first leaf spring and the second leaf spring can be inserted along with the sliders.

3. The suspension according to claim 2,
   wherein
   the first and the second leaf springs are formed so that widths of the both end portions in the front and rear direction of the vehicle are narrowed toward outer sides in the vehicle width direction;
   the engaging portion of each of the receiving pieces is an erected wall disposed along one end portions of the first and second leaf springs; and
   the slider includes a flange portion extending at least in downward from an end edge thereof, the end edge extending along the vehicle width direction, the flange portion capable of sliding along a side wall of the recess portion.

4. The suspension according to claim 1, wherein the spacer comprises: a metal plate adhered to the second leaf spring; and
   an elastic member made of rubber connected to the metal plate by vulcanizing adherence and brought into contact with the first leaf spring.

* * * * *